US007791611B1

United States Patent

(12) United States Patent
Holmqvist et al.
(10) Patent No.: US 7,791,611 B1
(45) Date of Patent: Sep. 7, 2010

(54) ASYNCHRONOUS REORDER BUFFER

(75) Inventors: Peter Holmqvist, Cary, NC (US); Robert Stoll, Los Altos, CA (US)

(73) Assignee: NVIDIA Corporation, Santa Clara, CA (US)

( * ) Notice: Subject to any disclaimer, the term of this patent is extended or adjusted under 35 U.S.C. 154(b) by 433 days.

(21) Appl. No.: 11/466,864

(22) Filed: Aug. 24, 2006

(51) Int. Cl.
*G09G 5/36* (2006.01)

(52) U.S. Cl. ..................................................... 345/545

(58) Field of Classification Search ................. 345/545, 345/557
See application file for complete search history.

(56) References Cited

U.S. PATENT DOCUMENTS 5,671,444 A * 9/1997 Akkary et al. ................ 710/52
6,260,123 B1 * 7/2001 Strongin et al. ............. 711/158
6,801,207 B1 * 10/2004 Tischler et al. .............. 345/557
2002/0109694 A1 * 8/2002 Champion et al. .......... 345/536
2006/0288134 A1 * 12/2006 Baker et al. .................. 710/52

* cited by examiner

*Primary Examiner*—Xiao M Wu
*Assistant Examiner*—Edward Martello
(74) *Attorney, Agent, or Firm*—Patterson & Sheridan, LLP

(57) ABSTRACT

A data buffer incorporated in the read return path between a processing pipeline and a frame buffer enables data reads from the buffer to be in a different order from data writes to the buffer. With this buffer, the frame buffer no longer is required to process read requests in any particular order and can be configured for improved processing speeds. The buffer includes a RAM to which data from the frame buffer is written according to a first order and from which data is read according to a second order. The buffer may be configured with multiple RAMs if the speed of data arriving from the frame buffer is greater than the write speed of the RAM.

7 Claims, 5 Drawing Sheets

ASYNCHRONOUS REORDER BUFFER

FIELD OF THE INVENTION

The present invention relates generally to read data buffers, and more specifically, to a read data buffer that allows data reads from the buffer to be in a different order than data writes to the buffer.

BACKGROUND

In graphics processing, frame buffers are used to store data that are needed by various processing pipelines. When a processing pipeline requests data from a frame buffer, the requested data is retrieved from the frame buffer and returned along a read return path via a read data buffer. The read data buffer is implemented as a first-in, first-out (FIFO) buffer and is placed in the read return path to buffer the requested data. This buffer ensures that the requested data arrives at the processing pipeline when the processing pipeline is ready to use it.

A simple example of how a read request from a processing pipeline is carried out is described below with reference to FIG. 1. As shown in FIG. 1, the processing pipeline 110 issues a series of read requests to a frame buffer 120. In response to the read requests, the frame buffer 120 retrieves the data, in the order they were requested, and writes them into the read data buffer 130, in the order they were retrieved, which is the same as the order they were requested. When the processing pipeline 110 is ready to use the requested data, it reads the data from the read data buffer 130, in the order they were written into the read data buffer 130, which is the same as the order they were retrieved from the frame buffer 120 and requested by the processing pipeline 110.

SUMMARY OF THE INVENTION

The present invention provides a data buffer that allows data reads from the buffer to be in a different order than data writes to the buffer. With such a data buffer incorporated in a read return path between a processing pipeline of a graphics processing unit and a frame buffer, the frame buffer no longer is required to process read requests and return data in any particular order and can be configured for improved processing speeds.

A data buffer according to an embodiment of the present invention is incorporated in a read return path between a processing pipeline of a graphics processing unit and a frame buffer. The data buffer includes an addressable memory for storing data blocks received from the frame buffer, and an address lookup table that stores for each data block stored in the addressable memory, a unique identifier for the data block and the address of said addressable memory at which the data block is stored. In response to a read request for a certain data block stored in the addressable memory that includes a unique identifier for the certain data block, the address lookup table retrieves the address of the addressable memory associated with the unique identifier for the certain data block, and a read operation is carried out on the addressable memory using the retrieved address.

The data buffer may further comprise a score board memory that maintains a valid bit for all of the unique identifiers stored in the address lookup table. A valid bit for a unique identifier is set to "1" when the data block associated with the unique identifier is stored in the addressable memory and is available to be read from its location in the addressable memory. When a read request for a certain data block stored in the addressable memory is issued, the score board memory receives this read request and returns a read valid signal if the valid bit for the unique identifier for the certain data block is set as valid. After returning the read valid signal, the score board memory resets the valid bit for the unique identifier for the certain data block as invalid.

A data buffer according to another embodiment of the present invention is incorporated in a read return path between a processing pipeline and a memory unit and the data blocks retrieved from the memory unit are supplied to the data buffer at an input clock rate that is greater than the write speed of the addressable memory inside the data buffer. In order to write the incoming data stream into its addressable memory, the data buffer converts the incoming data stream to be wider and slower using a register that is clocked at the input clock rate and a multiplexer that is clocked at half the input clock rate and coupled to the input and the output of the register. The multiplexer receives at each cycle of half the input clock rate, the data blocks that are output from the register and input into the register, and supplies these data blocks to two addressable memory units. The data buffer further includes an address lookup table that stores for each data block stored in the addressable memory units, a unique identifier for the data block and the address of said addressable memory units at which the data block is stored. In response to a read request for a certain data block stored in the addressable memory units that includes a unique identifier for the certain data block, the address lookup table retrieves the address of the addressable memory units associated with the unique identifier for the certain data block, and a read operation is carried out on the addressable memory units using the retrieved address.

The multiplexer has first and second modes of operation. The multiplexer in the first mode of operation causes the data block that is output from the register and received at the multiplexer to be written into the first addressable memory unit and the data block that is input into the register and received at the multiplexer to be written into the second addressable memory unit. The multiplexer in the second mode of operation causes the data block that is output from the register and received at the multiplexer to be written into the second addressable memory unit and the data block that is input into the register and received at the multiplexer to be written into the first addressable memory unit. To distribute an equal amount of data to be loaded into each of the two addressable memory units, the multiplexer alternates between the two modes based on the amount of input data (0, 1 or 2 input cycles of data), the location of the available data (at the register input or register output or both) and a state bit that indicates which of the addressable memory units was last selected for a data load.

The present invention also provides a method of buffering a data stream from a frame buffer that is generated in response to a read request from a processing pipeline of a graphics processing unit. In this method, the data stream is buffered in an addressable memory for an asynchronous read by the processing pipeline. The method according to an embodiment of the present invention includes the steps of converting the data stream to be wider and slower, storing data blocks from the converted data stream in the addressable memory, and for each data block stored in the addressable memory, storing a unique identifier for the data block in an address lookup table. The converting step may include the steps of supplying the data stream at a first clock rate to a multiplexer, delaying the data stream by one clock cycle of the first clock rate and then supplying the delayed data stream to the multiplexer, and outputting a wider data stream from the multiplexer at a second clock rate that is half the first clock rate.

BRIEF DESCRIPTION OF THE DRAWINGS

Accompanying drawing(s) show exemplary embodiment(s) in accordance with one or more aspects of the present invention; however, the accompanying drawing(s) should not be taken to limit the present invention to the embodiment(s) shown, but are for explanation and understanding only.

DETAILED DESCRIPTION

Figure 1:
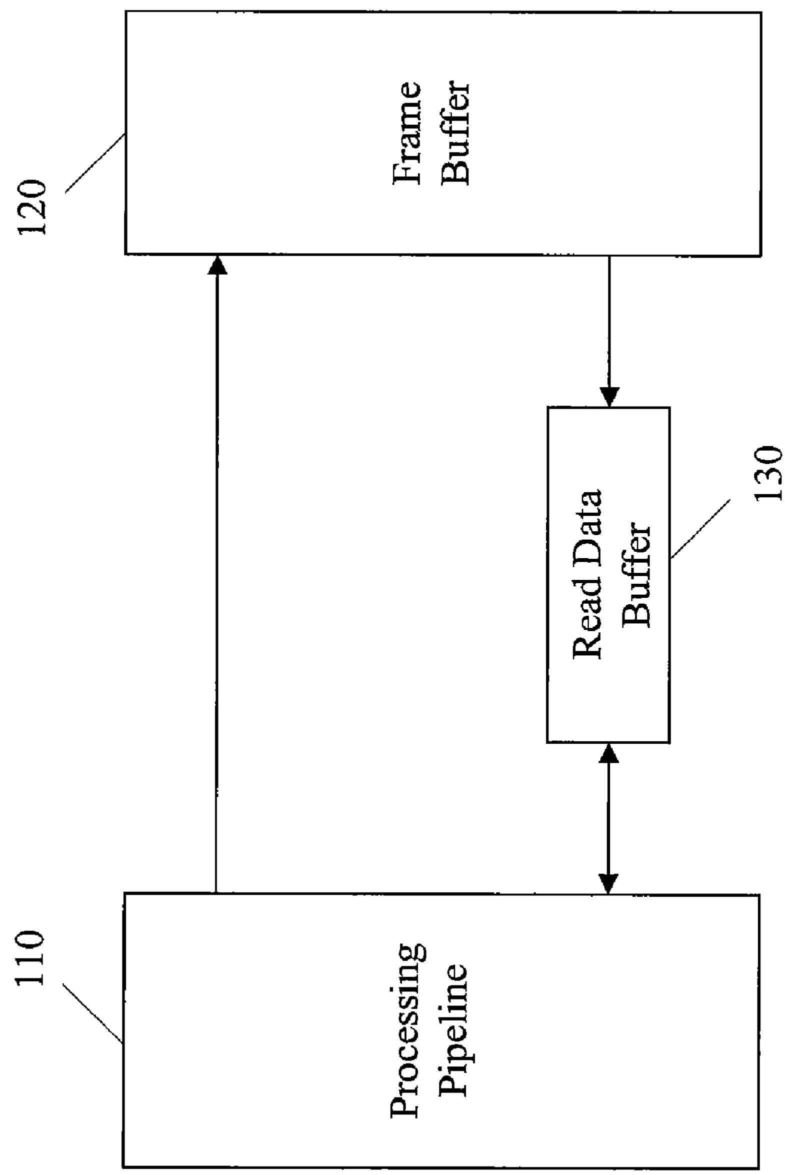
FIG. 1 illustrates a processing pipeline, a frame buffer, and a read data buffer incorporated in the read return path.
Figure 2:
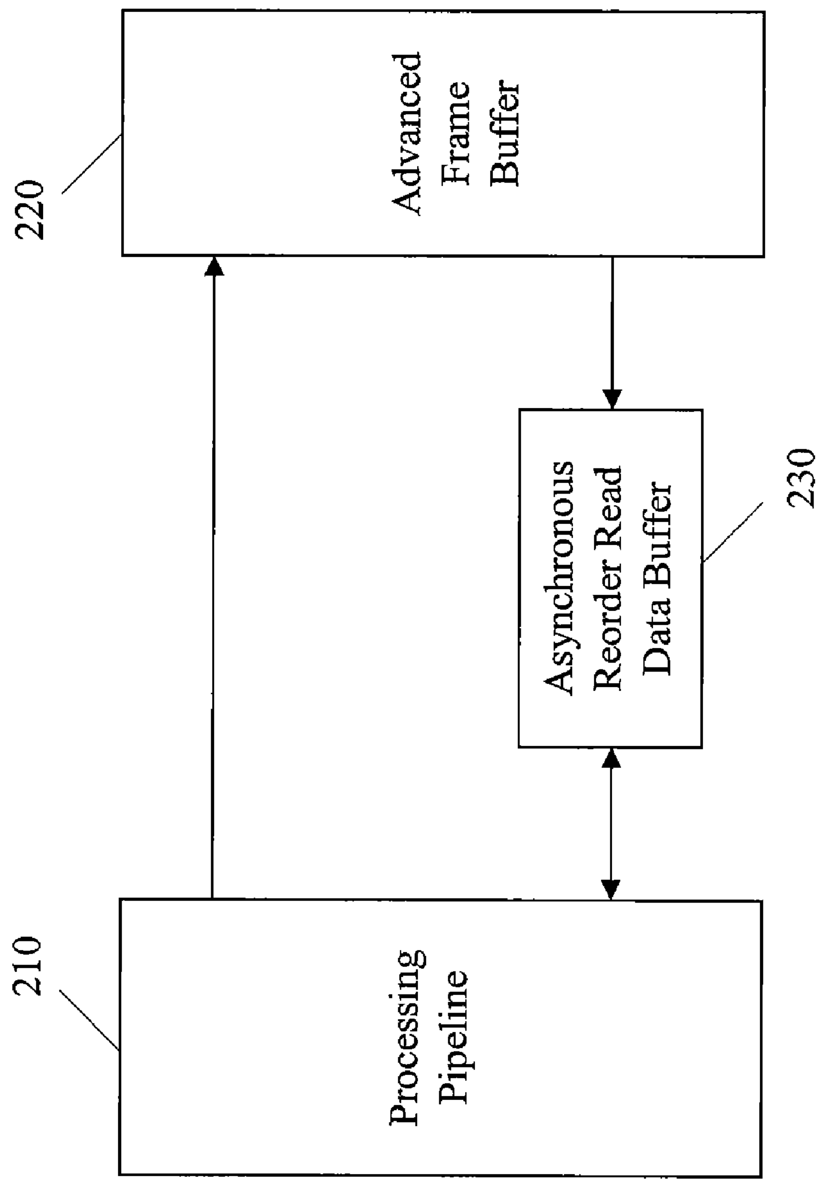
FIG. 2 illustrates a processing pipeline, a frame buffer, and a read data buffer according to an embodiment of the present invention.

FIG. 2 illustrates a processing pipeline 210, a frame buffer 220, and a read data buffer 230 according to an embodiment of the present invention. The processing pipeline 210 may be, for example, a part of the raster operation unit (ROP) of a graphics processing unit (GPU). The frame buffer 220 is a memory unit that stores data for various components of the GPU including the ROP. The frame buffer 220 is configured for more optimal processing relative to the frame buffer 120 of FIG. 1. Typically, frame buffer reads, such as from the frame buffer 120, are processed in the order they were requested. More advanced configurations of frame buffers, such as the frame buffer 220, process frame buffer reads in the order that is the most efficient for memory accesses. For example, read requests may be reorganized so that memory access to the same rows or banks are processed together.

In operation, the processing pipeline 210 issues a series of read requests to the frame buffer 220. In response to the read requests, the frame buffer 220 returns the requested data to the processing pipeline 210 via the read data buffer 230. The system of FIG. 2 operates differently from the system of FIG. 1 in the following ways. First, the read data buffer 230 enables data reads from it to be in a different order than data writes to it. Second, because of this ability of the read data buffer 230 to reorder data reads with respect to data writes, the system of FIG. 2 is operable with advanced frame buffers, like the frame buffer 220, which may not necessarily return read data in the order of the read requests.

An example of how a series of read requests issued by the processing pipeline 210 are carried out by the system of FIG. 2 is described below. First, the processing pipeline 210 issues a series of read requests to the frame buffer 220 in the following order: request_1, request_2, request_3, request_4, and request_5. In response to the read requests, the frame buffer 220 retrieves data in the order it determines to be the most optimal for memory accesses: e.g., data_3, data_4, data_2, data_5, and data_1, where data_n corresponds to data requested by request_n, and returns them in that order to the read data buffer 230. The read data buffer 230 receives this data in the order returned by the frame buffer 220 and enables the processing pipeline 210 to read them in a different order, i.e., the order of its read requests, namely data_1, data_2, data_3, data_4, and data_5.

Figure 3:
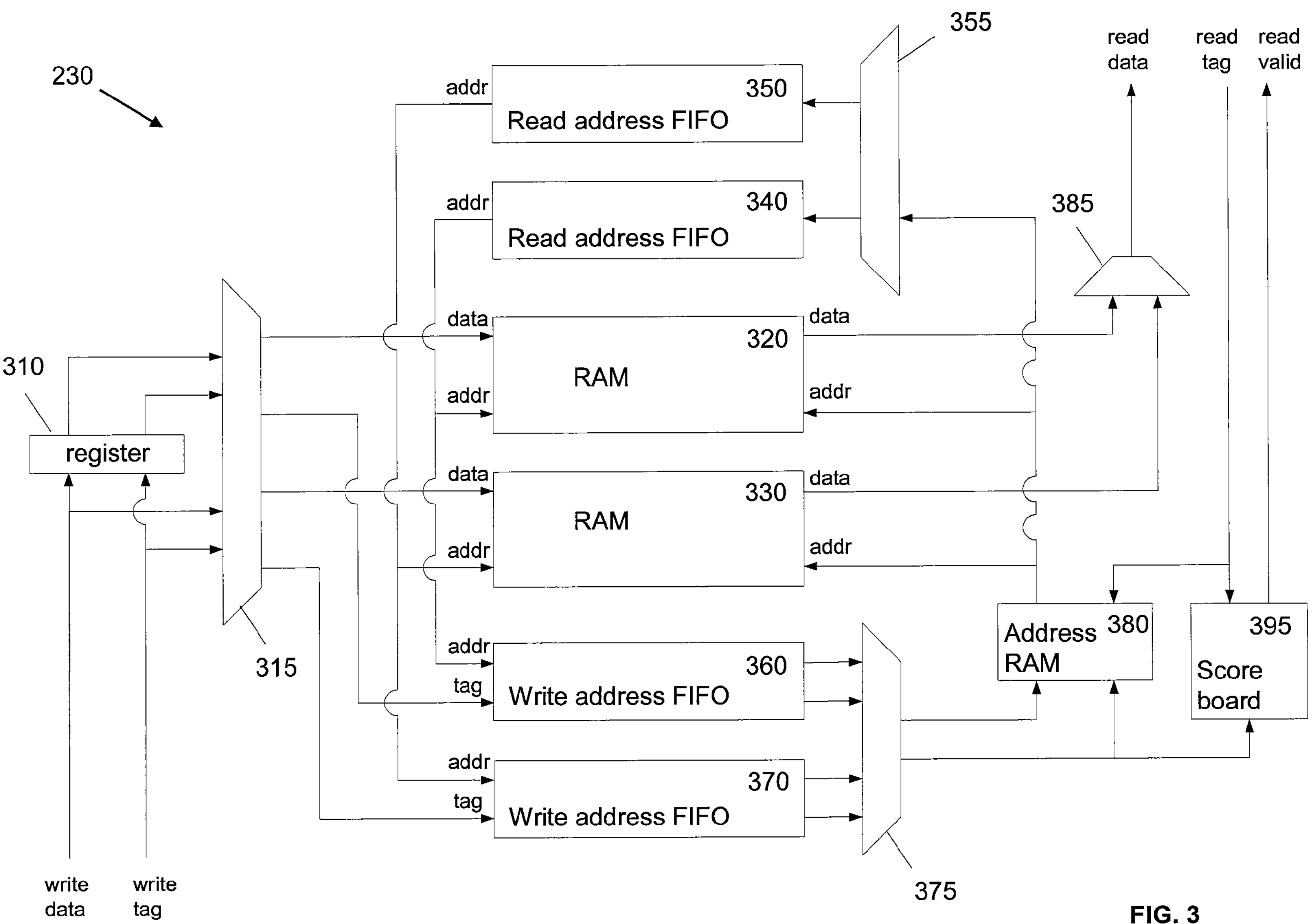
FIG. 3 is a block diagram of a read data buffer according to an embodiment of the present invention.

FIG. 3 is a block diagram of the read data buffer 230 according to an embodiment of the invention. As shown, the read data buffer 230 includes the following memory units: a register 310, RAMs 320, 330, read address FIFOs 340, 350, write address FIFOs 360, 370, an address RAM 380, and a score board 395. The RAMs 320, 330 are used to store data blocks (e.g., 16-byte data chunks) arriving from the frame buffer 220 for reading by the processing pipeline 210 at a later time. Each such data block is assigned a unique tag so that it can be identified during subsequent reads from the RAMs 320, 330 using this tag. There are various ways of assigning the unique tags for the data blocks. In the embodiment of the present invention illustrated herein, the unique tag is assigned as the address at which the data would have been stored in a conventional read data buffer, such as read data buffer 130.

The read address FIFOs 340, 350 store addresses of the RAMs 320, 330 that are available for new data blocks arriving from the frame buffer 220. When a new data block arrives from the frame buffer 220, an address is popped off from the read address FIFOs 340, 350 and the new data block is stored in the RAMs 320, 330 at that address. This address and the unique tag assigned to this new data block are stored together in the write address FIFOs 360, 370. Addresses and unique tags are unloaded from the write address FIFOs 360, 370 through a multiplexer 375 as soon as they become available, and stored in the address RAM 380. The address RAM 380 is configured as a lookup table that associates the unique tags of data blocks with addresses of RAMs 320, 330 at which the data blocks are stored. The score board 395 keeps track of the validity of tags. A tag is valid when its associated data block is stored in one of the RAMs 320, 330 and the data block is available to be read. A valid tag has a valid bit set to "1" in the score board 395.

The read data buffer 230 in FIG. 3 is configured with the register 310, and a pair of RAMs 320, 330, write address FIFOs 360, 370 and read address FIFOs 340, 350 to accommodate data blocks arriving at the read data buffer 230 at a higher clock rate than the individual write speed of the RAMs 320, 330. The register 310 is clocked at the input data rate, and enables the data blocks to be loaded double wide at half rate into the RAMs 320, 330.

An example of how the register 310 is used to enable the data blocks to be loaded double wide at half rate into the RAMs 320, 330 is given below. There may be zero, one, or two data blocks arriving at the data return buffer 230 to be written into the RAMs 320, 330 at each half rate cycle. If there are two data blocks, the first data block is stored in the register 310. One cycle later, the first data block stored in the register 310 and the second data block arrive at the multiplexer 315.

The multiplexer 315 operates at the half rate cycle and has first and second modes of operation. The multiplexer 315 in the first mode of operation causes the data block that is output from the register 310 and received at the multiplexer 315 to be written into the RAM 320 and the data block that is input into the register 310 and received at the multiplexer 315 to be written into the RAM 330. The multiplexer 315 in the second mode of operation causes the data block that is output from the register 310 and received at the multiplexer 315 to be written into the RAM 330 and the data block that is input into the register 310 and received at the multiplexer 315 to be written into the RAM 320.

To distribute an equal amount of data to be loaded into each of the two addressable memory units, the multiplexer alternates between the two modes based on the amount of input data (0, 1 or 2 input cycles of data), the location of the available data (at the register input or register output or both) and a state bit that indicates which of the addressable memory units was last selected for a data load. The table below describes how the multiplexer mode is selected based on these parameters.

| Register Input | Register Output | Last Load | Multiplexer Mode |
|---|---|---|---|
| No Data | No Data | RAM 320 | First mode |
| No Data | Data | RAM 320 | Second mode |
| Data | No Data | RAM 320 | First mode |
| Data | Data | RAM 320 | First mode |
| No Data | No Data | RAM 330 | First mode |
| No Data | Data | RAM 330 | First mode |
| Data | No Data | RAM 330 | Second mode |
| Data | Data | RAM 330 | First mode |

Alternatively, the multiplexer mode is controlled based on the number of free positions in each RAM 320, 330, such that when only one data block appears at the register input and output, it is always loaded into the RAM 320, 330 with the most free locations.

The tags associated with the data blocks arrive at the read data buffer 230 at the same speed as the data blocks, and the register 310 is used to enable the tags to be loaded double wide at half rate into the write address FIFOs 360, 370 in the same manner as the data blocks.

Before a data block is written to RAM 320, a write address corresponding to an available memory location in RAM 320 is picked off from the read address FIFO 340, and the data block is written to that memory location. Before a data block is written to RAM 330, a write address corresponding to an available memory location in RAM 330 is picked off from the read address FIFO 350, and the data block is written to that memory location.

In addition, when a data block is written to a memory location in the RAM 320 or 330, the tag of the data block and the address corresponding to that memory location are stored in the corresponding write address FIFO 360 or 370. Tags and write addresses stored in the write address FIFOs 360, 370 are unloaded into the address RAM 380 through multiplexer 375 as soon as they become available in the write address FIFOs 360, 370. The multiplexer 375 is controlled so that the tags and write addresses are unloaded from the write address FIFOs 360, 370 with round robin priority. The address RAM 380 stores the tags and the write addresses unloaded from the write address FIFOs 360, 370 in a lookup table. The unloaded tags are also supplied to the score board 395, which sets a valid bit associated with each of the unloaded tags. A valid bit for a tag indicates that the tag is being used and that the tag has an associated data block stored in one of the RAMs 320, 330. The lookup table stored in the address RAM 380 provides the address of the RAMs 320, 330 where the associated data block is stored.

For a data block read from the read data buffer 230, the processing pipeline 210 sends the tag associated with the desired data block to the read data buffer 230. This tag is supplied to the score board 395 and the address RAM 380. The score board 395 is accessed and the valid bit for this tag is examined to see whether the data block is available in the RAMs 320, 330 for a read operation. If the data block is available (e.g., the valid bit is set to "1"), the address corresponding to the tag is retrieved from the lookup table stored in the address RAM 380. The data block is then retrieved from the RAMs 320, 330 using the retrieved address and output through multiplexer 385 to the processing pipeline 210. In addition, the valid bit associated with the tag is reset to "0" in the score board 395, and the address associated with this tag is alternately pushed into the read address FIFOs 340, 350 through multiplexer 355 and becomes available for reuse. Upon power-up or reset of the read data buffer 230, the read address FIFOs 340, 350 are populated with all of the addresses of RAMs 320, 330.

Figure 4:
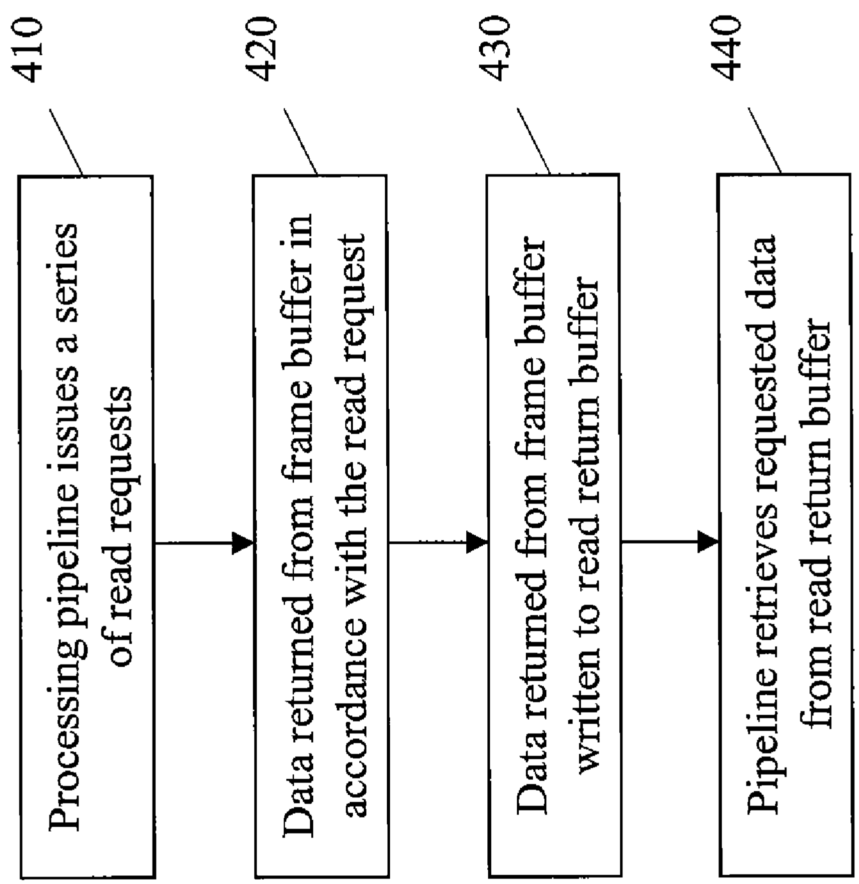
FIG. 4 is a flow diagram that illustrates the process steps that are carried out in response to read requests issued by a processing pipeline for data stored in a frame buffer.

FIG. 4 is a flow diagram that illustrates the process steps that are carried out in response to read requests issued by a processing pipeline. In step 410, the processing pipeline 210 issues a series of read requests to the frame buffer 220 for data needed by the processing pipeline 210. In step 420, data are returned by the frame buffer 220 responsive to the read requests in the order it determines to be the most optimal. In step 430, the data returned by the frame buffer 220 are written to the read data buffer 230 in the order they were returned by the frame buffer 220. The data blocks written in the read data buffer are marked with unique tags so that they can be retrieved by the processing pipeline 210 using the same tags. In step 440, the processing pipeline 210 retrieves the requested data blocks from the read data buffer 230 in the order it needs them using the unique tags. Generally, this is the same order as the order of the read requests that were issued to the frame buffer 220.

Figure 5:
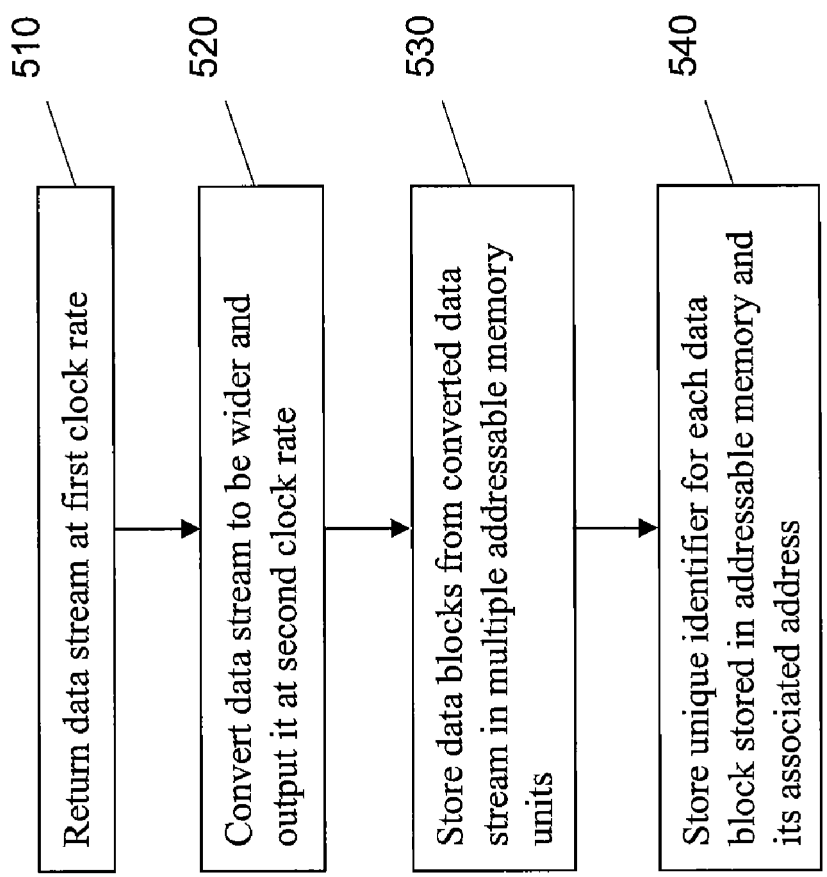
FIG. 5 is a flow diagram that illustrates the process steps that are carried out by a read data buffer to buffer the data stream from a frame buffer.

FIG. 5 is a flow diagram that illustrates the process steps that are carried out by the read data buffer 230 to buffer a data stream from the frame buffer 220. In step 510, the frame buffer 220 returns a data stream to the read data buffer 230 in response to read requests from the processing pipeline 210. In step 520, the read data buffer 230 converts the data stream to be double wide and clocked at half the incoming rate. This is done so that addressable memory units in the read data buffer 230 used for buffering the data stream can accommodate the speed of the incoming data stream. In step 530, the data blocks from the converted data stream are stored in the addressable memory units. In step 540, a unique identifier and the write address for each data block stored in the addressable memory are stored in an address lookup table. The address lookup table is used in subsequent, asynchronous reads of the data blocks stored in the addressable memory units.

While foregoing is directed to embodiments in accordance with one or more aspects of the present invention, other and further embodiments of the present invention may be devised without departing from the scope thereof, which is determined by the claims that follow. Claims listing steps do not imply any order of the steps unless such order is expressly indicated.

What is claimed is:

1. A data buffer incorporated in a read return path between a processing pipeline and a memory unit, wherein data retrieved from the memory unit supplied to the data buffer at an input clock rate, said data buffer comprising:

a register including a register input and a register output, the register clocked at the input clock rate for receiving, at the register input, the data and unique identifiers associated with the data;

a multiplexer clocked at half the input clock rate coupled to the register input and coupled to the register output, the multiplexer receiving, at each cycle of half the input clock rate, a first data and unique identifier pair that is output from the register output and a second data and the unique identifier pair that is being stored into the register via the register input;

at least two addressable memory units including a first addressable memory unit coupled to a first output of the multiplexer and configured to store a first stream of data output from the multiplexer at half the input clock rate, and a second addressable memory unit coupled to a second output of the multiplexer and configured to store a second stream of data output from the multiplexer at half the input clock rate;

an address lookup table that stores for each data stored in the at least two addressable memory units, a unique identifier for said data and the address of said addressable memory unit at which said data is stored; and a score board memory that maintains a valid bit for all of the unique identifiers stored in the address lookup table, wherein, in response to a read request for a certain data that includes a unique identifier for said certain data, the score board memory receives the read request and returns a read valid signal if the valid bit for the unique identifier for said certain data is set as valid, wherein the address lookup table retrieves the address of said addressable memory unit associated with the unique identifier for said certain data, and a read operation is carried out on the addressable memory unit using the retrieved address, wherein the score board memory resets the valid bit for the unique identifier for the certain data as invalid after returning the read valid signal, wherein the multiplexer alternates between a first mode of operation and a second mode of operation based on (i) an amount of data supplied, (ii) whether data is present at a register input of the register or a register output of the register or both, and (iii) a state bit that indicates which of the first or second addressable memories was last selected for a data load, and wherein the multiplexer in the first mode of operation causes the data that is output from the register output and received at the multiplexer to be written into the first addressable memory unit and the data that is being stored into the register via the register input and received at the multiplexer to be written into the second addressable memory unit, and the multiplexer in the second mode of operation causes the data that is output from the register output and received at the multiplexer to be written into the second addressable memory unit and the data that is being stored into the register via the register input and received at the multiplexer to be written into the first addressable memory unit.

2. The data buffer according to claim 1, further comprising a first address memory for storing addresses of available memory locations in the first addressable memory unit and a second address memory for storing addresses of available memory locations in the second addressable memory unit, wherein the retrieved address is stored in the first address memory if the read operation is carried out on the first addressable memory unit and the retrieved address is stored in the second address memory if the read operation is carried out on the second addressable memory unit.

3. The data buffer according to claim 1, wherein an address corresponding to an available memory location in the first addressable memory unit is retrieved from the first address memory before a write operation is carried out on the first addressable memory unit for any data and an address corresponding to an available memory location in the second addressable memory unit is retrieved from the second address memory before a write operation is carried out on the second addressable memory unit for any data.

4. A method of buffering a data stream from a frame buffer that is generated in response to a read request from a processing pipeline of a graphics processing unit, wherein the data stream is buffered in an addressable memory for an asynchronous read by the processing pipeline and the write speed of the addressable memory is slower than the speed of the data stream, said method comprising the steps of:

receiving a first data included in the data stream, wherein the data stream is received at a first clock rate;

storing the first data in a register;

receiving a second data included in the data stream;

providing the first data stored in the register and the second data to a multiplexer;

outputting a wider data stream from the multiplexer at a second clock rate that is half the first clock rate;

storing data from the wider data stream in the addressable memory, wherein the addressable memory includes a first addressable memory and a second addressable memory, wherein a first half of the wider data stream is supplied to the first addressable memory via a first multiplexer output, and a second half of the wider data stream is supplied to the second addressable memory via a second multiplexer output; and for each data stored in the addressable memory, storing a unique identifier for said each data in an address lookup table, wherein, in response to a read request for a certain data that includes a unique identifier for said certain data, a score board memory maintains a valid bit for all of the unique identifiers stored in the address lookup table, receives the read request, and returns a read valid signal if the valid bit for the unique identifier for said certain data is set as valid, wherein the address lookup table retrieves the address of said addressable memory associated with the unique identifier for said certain data, and a read operation is carried out on the addressable memory using the retrieved address, wherein the score board memory resets the valid bit for the unique identifier for the certain data as invalid after returning the read valid signal, wherein the multiplexer alternates between a first mode of operation and a second mode of operation based on (i) an amount of data supplied, (ii) whether data is present at a register input of the register or a register output of the register or both, and (iii) a state bit that indicates which of the first or second addressable memories was last selected for a data load, and wherein the multiplexer in the first mode of operation causes the data that is output from a register output and received at the multiplexer to be written into the first addressable memory and the data that is being stored into the register via a register input and received at the multiplexer to be written into the second addressable memory, and the multiplexer in the second mode of operation causes the data that is output from the register output and received at the multiplexer to be written into the second addressable memory and the data that is being stored into the register via the register input and received at the multiplexer to be written into the first addressable memory.

5. The method according to claim 4, wherein the first half of the wider data stream is supplied to the first addressable memory and the second half of the wider data stream is supplied to the second addressable memory at odd clock cycles of the second clock rate, and wherein the first half of the wider data stream is supplied to the second addressable memory and the second half of the wider data stream is supplied to the first addressable memory at even clock cycles of the second clock rate.

6. The method according to claim 5, further comprising the step of supplying a selector signal to the multiplexer at every other clock cycle of the second clock rate.

7. The method according to claim 4, wherein the asynchronous read by the processing pipeline is carried out using a read request for a certain data stored in the addressable memory that includes a unique identifier for said certain data block.

* * * * *